Patented Oct. 10, 1950

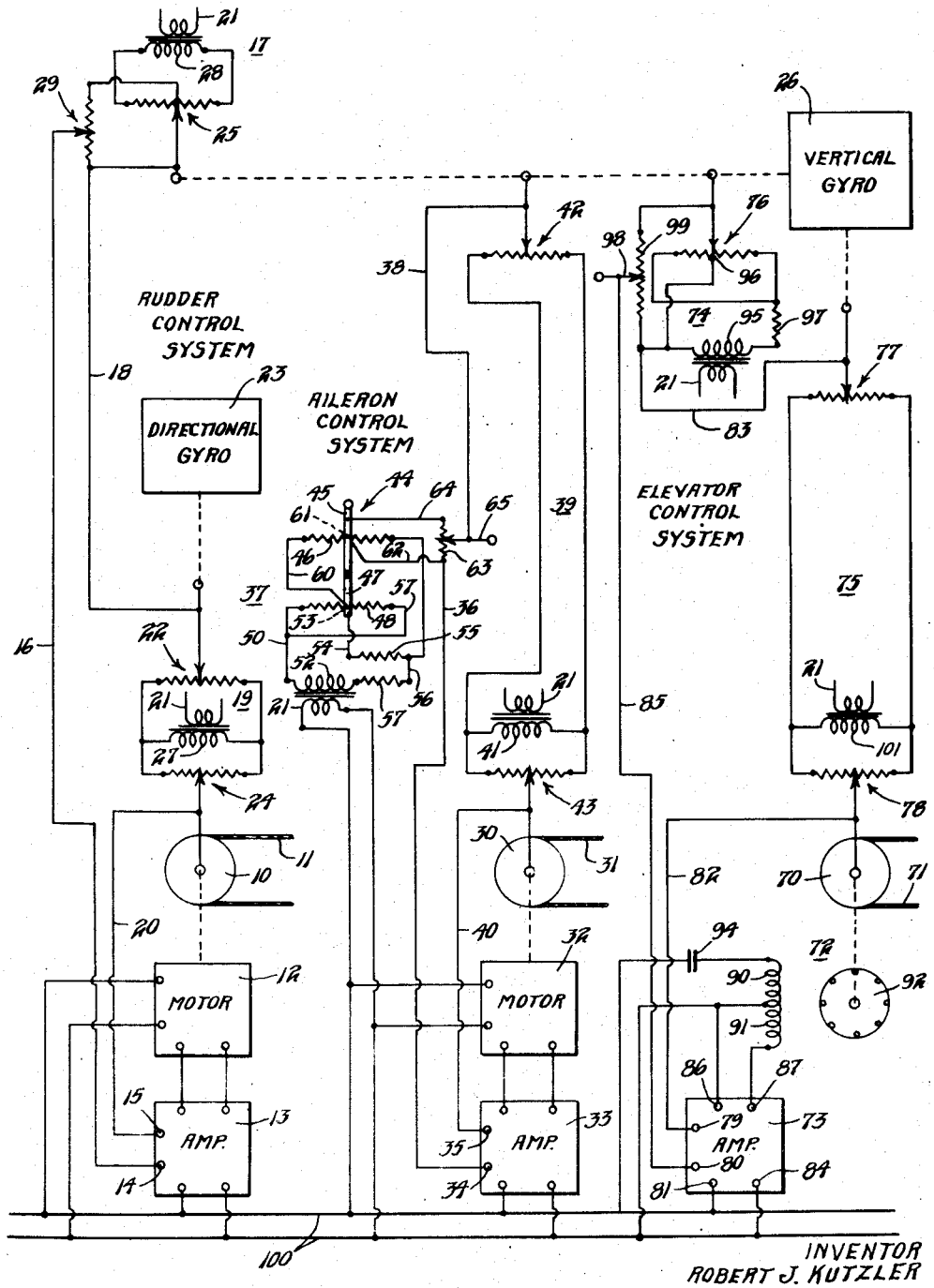

2,525,038

UNITED STATES PATENT OFFICE 2,525,038

AIRCRAFT CONTROL APPARATUS

Robert J. Kutzler, Minneapolis, Minn., assignor to Minneapolis-Honeywell Regulator Company, Minneapolis, Minn., a corporation of Delaware Application December 14, 1942, Serial No. 468,946

8 Claims. (Cl. 244—77)

The present invention relates to control apparatus, and particularly to apparatus for automatically operating the flight control surfaces of an aircraft.

An object of the present invention is to provide an improved flight control system for aircraft of the type shown and described in the copending application of Willis H. Gille Serial No. 447,989, filed June 22, 1942. The system shown in the Gille application includes a system for controlling each flight control surface which is responsive to the resultant of two controlling conditions. In the case of the rudder, one of the controlling conditions is the deflection of the aircraft from a predetermined course, as measured by a directional gyroscope, and the other controlling condition is the tilting of the aircraft about a longitudinal axis passing through it from nose to tail, as measured by a vertical gyroscope. In the case of the ailerons, the same two controlling conditions are utilized. In the case of the elevator, the two controlling conditions are the attitude of the aircraft, or in other words its angular position with respect to an axis passing through it laterally from side to side, and the tilting of the aircraft about the longitudinal axis previously referred to. Both of these conditions are measured by a single vertical gyroscope.

In the Gille system, a linear relationship exists between the rudder position and the resultant of the two conditions which control the rudder. A similar linear relationship exists between the resultant of these two conditions and the position of the ailerons. I have found that by controlling the ailerons in accordance with an exponential function of the deviation of the aircraft from its course, as measured by the directional gyroscope, that more stable flight conditions are produced and that more perfect banking of the aircraft is obtained.

It is therefore an object of the present invention to provide a system for controlling a flight control surface on an aircraft in accordance with a non-linear function of a controlling condition.

Another object of this invention is to provide a system for controlling the ailerons of an aircraft in accordance with the resultant of an exponential function of the deviation of the aircraft from its course and a linear function of the angular position of the aircraft with respect to a longitudinal axis passing therethrough. A still further object is to provide a system in which the ailerons are controlled in the manner just described, while the rudder is controlled in accordance with the resultant of linear functions of both the controlling conditions referred to.

A further object of this invention is to provide an improved electrical network for producing an electrical potential which varies in magnitude as a non-linear function of a variable condition.

A further object of the present invention is to provide an electrical control system in which a controlled device is operated in accordance with an exponential function of a controlling condition.

Other objects and advantages of the present invention will become apparent from a consideration of the accompanying specification, claims and drawing, in which, a single figure represents, somewhat diagrammatically, an electrical system for operating the flight control surfaces of an aircraft, embodying the principles of my invention.

Referring to the drawing, there is shown a rudder control system including a pulley 10 over which passes a cable 11 which may be attached to the rudder (not shown). The pulley 10 is driven by a motor 12. The supply of electrical energy to the motor 12 is controlled by an amplifier 13 having a pair of input terminals 14 and 15. The motor and amplifier operation will be described subsequently. Electrical control signals are impressed on the input terminals 14 and 15 by means of a circuit which may be traced from terminal 14 through a conductor 16, a compensating network 17, a conductor 18, a main network 19, and a conductor 20 to terminal 15.

The signal potential supplied to this circuit by the main network 19 is determined in accordance with the relative positions of a rudder control potentiometer 22 operated by a directional gyroscope 23, and a follow-up potentiometer 24, which is operated simultaneously with the pulley 10. Potentiometers 22, 24 are connected across the secondary winding 27 of a transformer to form a bridge. The transformer has a primary winding 21. Since in the networks to be described, the several transformer secondary windings may, as conventional, have a common primary winding, the primary winding in each instance is identified by the same reference character 21. The signal potential supplied to this circuit by the compensating network 17 is determined by the position of a rudder compensating potentiometer 25 driven by a vertical gyroscope 26 in accordance with an angular position of the aircraft with respect to a longitudinal axis passing therethrough. The resistor of potentiometer 25 is connected across the secondary winding 28 of a transformer having a primary winding 21. A trimmer potentiometer 29 has its resistor connected across a center tap of the resistor and wiper of potentiometer 25. Lead 16 is connected to the wiper of the trimmer potentiometer 29.

The signal potentials supplied by the main network 19 and the compensating network 17 are connected in series to the input terminals of the amplifier 13, so that the resultant of these two signal potentials is impressed on the amplifier input circuit. The amplifier controls the motor 12 which drives the pulley 10 to position the rudder and to position the rudder follow-up potentiometer 24 so that the resultant potential impressed on the input terminals of the amplifier is reduced to zero, whereupon the motor is stopped.

There is also shown in the drawing an aileron control system in which a pulley 30 drives a cable 31, which may be attached to the ailerons (not shown). The pulley 30 is driven by a motor 32 controlled by an amplifier 33 having input terminals 34 and 35. The signal potential impressed on the amplifier input terminals 34 and 35 is determined by a circuit which may be traced from terminal 34 through a conductor 36, a compensating network generally indicated at 37, a conductor 38, a main network 39, and a conductor 40 to input terminal 35.

The signal potential produced in this circuit by the main network 39 is determined by the relative positions of a control potentiometer 42 operated by the vertical gyroscope 26 in accordance with the angular position of the aircraft with respect to its longitudinal axis, and an aileron follow-up potentiometer 43, which is driven concurrently with the pulley 30. The potentiometers 42, 43 are connected across a secondary winding 41 of a transformer having a primary winding 21.

The signal potential produced by the aileron compensating network 37 is determined by the position of a dual slider 44 which is moved by the directional gyroscope 23 in accordance with the deviation of the aircraft from a predetermined course. The slider 44 has a first portion 45 which cooperates with a slide wire resistance 46, and a second portion 47 insulated from the portion 45. The second portion 47 cooperates with another slide wire resistance 48. The opposite terminals of the resistance 48 are connected through conductors 50 and 51 to the same terminal of a transformer secondary winding 52 of a transformer having a primary winding 21. The resistance 48 is provided with a center tap 53 which is connected through a conductor 54, a resistance 55, a conductor 56, and a resistance 57 to the opposite terminal of secondary winding 52. One terminal of resistance 46 is connected through a conductor 60 to the second portion 47 of slider 44. The other terminal of resistance 46 is connected to conductor 56. The resistance 46 is provided with a center tap 61 which is connected through a conductor 62 to one terminal of a resistance 63. The other terminal of resistance 63 is connected through a conductor 64 to the first portion 45 of slider 44. An adjustable tap 65 associated with resistance 63 is connected to conductor 38. The lower terminal of resistance 63 is connected to conductor 36.

By reference to the compensating network 37, it may be seen that when the slider 44 is in the position shown in the drawing, the resistance 63 is shunted through conductor 64, the first portion 45 of slider 44, center tap 61 on resistance 46, and conductor 62. Therefore, the network 37 introduces no signal potential into the circuit connected between amplifier input terminals 34 and 35.

Now let it be assumed that the slider 44 moves clockwise from the position shown in the drawing, so that the first portion 45 moves to the left along resistance 46 and the second portion 47 moves to the left along resistance 48. The terminal potential at the secondary winding 52 is divided between the resistances 55 and 57, and the two opposite halves of the resistance 48, which two halves are connected in parallel as far as any current flowing through them from the secondary winding 52 is concerned.

The potential impressed across the terminals of resistance 46 depends upon the position of portion 47 of slider 44 along resistance 48. In order to simplify the explanation, consider the potential conditions existing in the network 37 at a time when the left-hand terminal of secondary winding 52 is positive with respect to its right-hand terminal. Under such conditions, it may be seen that the potential impressed across the terminals of resistance 46 is at a minimum when the slider 44 is in its center position and as portion 47 of slider 44 moves either to the left or right of its center position along resistance 48, the potential of the left-hand terminal of resistance 46 is increased in a positive direction, thereby increasing the total potential drop across resistance 46.

If a constant potential were supplied to the terminals of resistance 46, the signal potential produced across resistance 63 would be a linear function of the position of first portion 45 of slider 44 along the resistance 46. However, in the present circuit, the total potential drop across resistance 46 increases continuously as the slider 44 moves away from its center position. Therefore, the potential drop per unit length of resistance 46 increases continuously under the same conditions. Therefore, the potential impressed across resistance 63 is not a linear function of the position of slider 44, but is an exponential function of that position. The exact nature of this exponential function in any given case is determined by the relative values of the various resistances elements in the network 37.

A portion of the potential developed across resistance 63, which portion is determined by the setting of slider 65, is introduced into the circuit connecting the amplifier input terminals 34 and 35 as the signal potential provided by the network 37. It may therefore be seen that the aileron motor 32 is controlled in accordance with the resultant of a potential obtained from main network 39 and a potential obtained from compensating network 37, that the potential obtained from network 39 is a linear function of the angular position of the aircraft with respect to its longitudinal axis, and that the potential obtained from compensating network 37 is an exponential function of the deviation of the aircraft from its predetermined course.

There is also shown in the drawing an elevator control system, including a pulley 70 over which passes a cable 71 connected to the elevator surfaces (not shown). The pulley 70 is driven by a motor 72 controlled by an amplifier 73. The motor and amplifier may be similar to that disclosed in the patent to Beers 2,020,275 issued November 5, 1935. The motor 72 as illustrated is a capacitor motor whose rotor 92 is reversibly driven by the rotating field set up by stator windings 90, 91. Stator winding 90 has one end connected through a capacitor 94 to one side of a line 100 which is connected to a source of alternating current (not shown). The other end of winding 90 is directly connected to the other side of line 100. Winding 91 is connected across the output terminals 86, 87 of amplifier 73. Terminals 81, 84 of amplifier 73 are connected across line 100. The signal input terminals 79, 80 of amplifier 73 are connected to sources of signals through a circuit extending from terminal 79, lead 82, main elevator network 75, lead 83, elevator compensating network 74, lead 85, to terminal 80 of amplifier 73.

The direction of rotation of rotor 92 and pulley 70 driven thereby is determined by the phase relationship between the volatge across signal input terminals 79, 80 of amplifier 73 and the voltage across terminals 81, 84 of amplifier 73 which are connected across line 100.

The motor and amplifier arrangement described with reference to the elevator control system are duplicated in the rudder and aileron control systems where they are merely illustrated by the conventional block diagram. The description of the elevator control system motor and amplifier is considered sufficient since the others are mere duplicates. The amplifier 73 is provided with a signal potential which is the resultant of two signal potentials provided by a compensating network 74 and a main network 75. The signal potential provided by the compensating network 74 is determined by a control potentiometer 76 operated by the vertical gyroscope 26 in accordance with the angular position of the aircraft with respect to its longitudinal axis. The resistor of potentiometer 76 has both ends connected through a limiting resistor 97 to one end of a secondary winding 95 of a transformer having a primary winding 21. A center tap 96 on the potentiometer resistor is connected to the opposite end of the secondary winding 95. A trimmer potentiometer has its resistor 99 connected across the wiper and resistor center tap 96 of potentiometer 76. A wiper 98 of the trimmer potentiometer is connected to lead 85. The primary winding 21 of each network is connected, as illustrated by primary winding 21 having secondary winding 52 in the aileron control system, across the line 100. The phase of the voltage obtained from network 76 like that from the other networks depends upon the direction which the potentiometer wiper is moved with respect to the center tap of the potentiometer resistor. The signal potential provided by the main network 75 is determined by the relative positions of a main controller 77 which is operated by the vertical gyroscope 26 in accordance with the angular position of the aircraft with respect to its lateral axis and an elevator follow-up potentiometer 78 which is operated concurrently with the pulley 70. The main network potentiometers 77, 78 are connected in parallel across the ends of a secondary winding 101 of a transformer having a primary winding 21. The potentiometers are thus arranged as a bridge with their wipers forming the output elements of the bridge. The wiper of potentiometer 77 is connected to lead 83 and the wiper of potentiometer 78 is connected to lead 82.

The main network of the rudder, aileron, and elevator control systems are also described in detail in the Gille application previously referred to, as are also the rudder and elevator compensating networks. The following table lists the values for the potentiometer resistances and secondary windings which have given the desired operation.

Resistor 46, 350 ohms
Reiistor 48, 350 ohms
Resistor 55, 340 ohms
Resistor 57, 340 ohms
Resistor 63, 2000 ohms
Resistor of potentiometer 25, 1145 ohms
Resistor 42, 1288 ohms
Resistor of potentiometer 24, 1100 ohms
Resistor of potentiometer 43, 1100 ohms
Resistor of potentiometer 22, 288 ohms
Secondary 52, 20 ohms, 30 volts, the secondary windings may be the same for all potentiometers.

The system I have described controls the ailerons so that they are deflected but sligthly from their normal positions when the aircraft is on or near its predetermined course the term course being understood to mean the direction or heading being maintained solely by a directional gyroscope. As the aircraft deviates further from its course, a change in the aileron position is caused so as to additionally bank the aircraft and turn it back to its original course. This change in the aileron position is an exponential function of the deviation of the aircraft from its course, so that as the aircraft departs further from its course, a disproportionately greater deflection of the ailerons is produced so as to restore the aircraft to its course more quickly.

It is desirable, for accurate navigation of an aircraft, to provide a control system which operates the flight controlling surfaces of the aircraft in such a manner that upon a deviation of the aircraft from its course, the flight controlling surfaces are operated to restore the aircraft to its course in a predetermined time, which time is substantially constant regardless of the amount of deviation. By properly proportioning the values of the various circuit elements in the system I have disclosed, the system may be made to operate the flight controlling surfaces in that manner.

Furthermore, it is desirable that the rate of turning of the aircraft, during a correction of its course, be so proportioned and related to the time required to complete the correction that the displacement of the aircraft from its course during the correction is definitely determinable as a function of the original devation. By making the correction time constant, as noted in the preceding paragraph, the displacement of the aircraft may be readily determined, if the original deviation is known, without the necessity of measuring the correction time.

While I have shown and described a preferred embodiment of my invention, other modifications thereof will readily occur to those skilled in the art, and I therefore wish my invention to be limited only by the appended claims.

I claim as my invention:

1. Apparatus for operating the rudder and ailerons of an aircraft, comprising in combination, motor means for positioning said ailerons, means for controlling said motor means in accordance with the resultant of an exponential function of the deviation of said aircraft from a predetermined course and a linear function of the angular tilt of said aircraft about its longitudinal axis, motor means for positioning said rudder, and means for controlling said rudder positioning motor means in accordance with the resultant of a linear function of the deviation of said aircraft from a predetermined course and a linear function of the tilt of said aircraft about its longitudinal axis.

2. Apparatus for operating the ailerons of an aircraft, comprising in combination, electrical motor means for positioning said ailerons, means responsive to the deviation of said aircraft from a predetermined course, means operated by said deviation responsive means for converting the linear value of the deviation for producing a first electrical signal potential variable in magnitude in accordance with an exponential function of said deviation, said exponent having a value greater than one, means responsive to the degree of tilt of said aircraft about its longitudinal axis, means operated by said angular tilt responsive means for producing a second electrical signal potential variable as a linear function of said angular tilt, means for combining said first and second signal potentials to produce a resultant signal potential, and means responsive to said resultant signal potential for controlling said electrical motor means.

3. Apparatus for operating the ailerons of an aircraft, comprising in combination, motor means connected to said ailerons for positioning the same, means responsive to the deviation of the aircraft and converting linear deviation into an exponential function of the deviation, said exponent being greater than unity, means responsive to the degree of tilt of said aircraft about its longitudinal axis, and means operated by both said responsive means for controlling said motor means in accordance with the resultant of said exponential function of the deviation of said aircraft from a predetermined course and a linear function of the degree of tilt of said aircraft.

4. Apparatus for controlling an aircraft having ailerons and a rudder, comprising: motor means for operating said ailerons; motor means for operating said rudder; means linearly responsive to changes in course of said aircraft; control means operated by said responsive means, for said rudder motor means; control means operated by said responsive means, for said aileron motor means, said aileron control means including means for converting the linear amount of the change in course into an exponential amount, said exponent being greater than one, whereby for different course changes there is a non-linear relation of the displacement of the ailerons with respect to the displacement of the rudder.

5. Electrical control apparatus, comprising in combination, a device to be controlled, electrical motor means for positioning said device, means movable in either of two directions and responsive to a condition indicative for the need for operation of said motor means for producing an electrical potential reversible in phase with direction of movement from a null position said potential increasing in magnitude as an exponential function of the deviation of said condition in either direction from a predetermined value, and means responsive to said potential for controlling said motor means, said potential producing means comprising a slidewire resistance, means for defining a null potential, a slider movable along said resistance in either of two directions from a null position on said resistance, means for positioning said slider as a linear function of said condition, and additional means for varying the potential across said resistance as a function of said condition.

6. Electrical control apparatus, comprising in combination, a device to be controlled, electrical motor means for positioning said device, means responsive to a condition indicative for the need for operation of said motor means for producing an electrical potential increasing in magnitude as an exponential function of the deviation of said condition in either direction from a predetermined value, means responsive to said potential for controlling said motor means, said potential producing means comprising a slidewire resistance, a slider movable along said resistance, a second slidewire resistance, a second slider movable along said second resistance, means for simultaneously positioning said slider as a linear function of said condition, a source of electrical potential, means for connecting both ends of said second resistance to one side of said potential source, means for connecting a center tap of said resistance to the other side of said potential source, connecting means from said center tap to one end of said first resistance, connecting means from said second slider to the other end of said first resistance, whereby the potential impressed across said first resistance varies as a linear function of said condition, and the potential of said first slider with respect to a center tap of said first resistance varies as an exponential function of said condition.

7. Electrical control apparatus, comprising in combination, a device to be controlled, electrical motor means for positioning said device, normally balanced electrical network means including a main controller and a follow-up controller, means responsive to a condition indicative of the need for operation of said device for positioning said main controller, a connection between said motor means and said follow-up controller whereby said follow-up controller is positioned by said motor means, one of said controllers comprising first and second resistance elements, first and second sliders cooperating respectively with said resistance elements, means for simultaneously positioning said sliders along said resistance elements in either of two directions from a null point on their respective resistors, a source of electrical potential, means including said second resistance and slider for connecting said source to said first resistance so that the potential impressed across said first resistance varies as a linear function of said slider position, and the potential of said first slider with respect to the null point of its resistor varies as an exponential function of said slider position, and means including said network for controlling said motor means.

8. Control apparatus for operating the ailerons and rudder surfaces of an aircraft which control said craft in a banked turn, said apparatus comprising: a first motor means for positioning said ailerons; a second motor means for positioning said rudder; a first balanceable system operable on unbalance thereof for controlling said aileron motor means; a second balanceable system operable on unbalance thereof for controlling said rudder motor means; means responsive to changes in heading of said aircraft; means responsive to tilt of said aircraft about its longitudinal axis; means for deriving in said first balanceable system differentially from said heading responsive means and said craft tilt responsive means an unbalancing control effect which is a nonlinear function having an exponent greater than one of the heading change and roll angle of said craft; means in said first balanceable system operated from said aileron motor means for deriving a rebalancing control effect equal and opposite to said first control effect to limit operation of said first motor means; means for deriving in said second balanceable system differentially from said heading responsive means and said craft tilt responsive means, an unbalancing control effect which is a linear function of the heading change and roll angle of said craft; means in said second balanceable system operated from said rudder motor means for deriving a rebalancing control effect equal and opposite to said unbalancing effect to limit operation of said second motor means; whereby said first control effect tends to more quickly change the bank angle of said craft than would a control effect linearly proportional to said heading change and roll angle so that the tendency of the aircraft, due to its resistance to change in attitude about the roll axis, to cause the actual bank of the craft to lag behind the appropriate bank for the heading angle change when using linear control, is substantially overcome.

ROBERT J. KUTZLER.

REFERENCES CITED

The following references are of record in the file of this patent:

UNITED STATES PATENTS

| Number | Name | Date |
|---|---|---|
| 1,086,729 | Rey | Feb. 10, 1914 |
| 1,506,936 | Lea | Sept. 2, 1924 |
| 1,800,328 | Sundhausen | Apr. 14, 1931 |
| 2,066,194 | Bates | Dec. 29, 1936 |
| 2,113,436 | Williams | Apr. 5, 1938 |
| 2,132,677 | Chance | Oct. 11, 1938 |
| 2,234,326 | Tiebel | Mar. 11, 1941 |
| 2,275,317 | Ryder | Mar. 3, 1942 |
| 2,286,561 | Meredith | June 16, 1942 |
| 2,356,152 | Edwards et al. | Aug. 22, 1944 |

FOREIGN PATENTS

| Number | Country | Date |
|---|---|---|
| 260,260 | Great Britain | Jan. 12, 1928 |

OTHER REFERENCES

RCA Review, vol. III, No. 1, July 1938, pages 93–95, incl.